(12) United States Patent
Raanan et al.

(10) Patent No.: US 6,311,278 B1
(45) Date of Patent: Oct. 30, 2001

(54) METHOD AND SYSTEM FOR EXTRACTING APPLICATION PROTOCOL CHARACTERISTICS

(75) Inventors: Gil Raanan, Zoran; Tal Moran, Tel-Aviv, both of (IL); Yoron Galant, Mountainview, CA (US); Yuval El-Hanani, Tel-Aviv (IL); Eran Reshef, Sunnyvale, CA (US)

(73) Assignee: Sanctum Ltd., Tel-Aviv (IL)

( * ) Notice: Subject to any disclaimer, the term of this patent is extended or adjusted under 35 U.S.C. 154(b) by 0 days.

(21) Appl. No.: 09/345,920

(22) Filed: Jul. 1, 1999

Related U.S. Application Data

(63) Continuation-in-part of application No. 09/149,911, filed on Sep. 9, 1998.

(51) Int. Cl.$^7$ .................................................. G06F 12/14
(52) U.S. Cl. ............................................. 713/201; 173/152
(58) Field of Search .................................. 713/200, 152, 713/201, 153, 202, 151; 709/223, 224, 225, 226, 227, 230; 380/243; 710/11

(56) References Cited

U.S. PATENT DOCUMENTS 4,734,853 * 3/1988 Nakano .................................. 710/11
5,073,933   12/1991 Rosenthal .

(List continued on next page.)

OTHER PUBLICATIONS

"Design and Implementation of a Security Management System", W. Song et al., IEEE 1995, especially p. 262, section entitled Simulator.

"Intrusion Detection Alert", K.L. Ida Peterson, IEEE 1992, pp. 306–311.

"Abstraction–based Misuse Detection: High Level Specification and Adaptable Strategies", J. Lin et al., IEEE 1998, Abstract, Figures 1 and Figures 2, entire document.

"Role–Based Access Control: A Multi–Dimensional View", R.S. Sandhu et al., IEEE 1994, Abstract, pp. 54–60.

"An Audit Model for Object Oriented Databases", B. Kogan et al., IEEE 1991, pp. 90–96.

"Developing Secure Systems: Issues and Solutions", J. Freeman et al., IEEE 1998, pp. 183–189.

"Formal Techniques for an ITSEC–E4 Secure Gatewway", Pierre Bieber, IEEE 1996, pp. 236–244.

Primary Examiner—James P. Trammell
Assistant Examiner—Pierre E. Elisca
(74) Attorney, Agent, or Firm—Brown Raysman Millstein Felder & Steiner, LLP

(57) ABSTRACT

A method and computer program for automatically and continually extracting application protocols (i.e., defining a set of allowable or authorized actions) for any application. The method involves receiving a message from a server before it is sent or in parallel with sending to a client. The message may be in response to a specific request for it from the client. The program then extracts the application protocol data from the server message. Working with a copy of the message, the program strips off the communications protocol(s) from the message and parses the remaining message to identify user-selectable options contained in the message such as commands, fields, etc. These items represent the set of allowable or authorized user actions for the particular "stage" of the current version of the application as set forth in the message. The set of allowable user actions is then stored by the extraction program in a protocol database accessible to a gateway or filter module.

26 Claims, 5 Drawing Sheets

U.S. PATENT DOCUMENTS

| | | | |
|---|---|---|---|
| 5,166,977 | * 11/1992 | Ross | 380/18 |
| 5,191,611 | 3/1993 | Lang . | |
| 5,220,604 | 6/1993 | Gasser et al. . | |
| 5,224,163 | 6/1993 | Gasser et al. . | |
| 5,315,657 | 5/1994 | Abadi et al. . | |
| 5,347,578 | 9/1994 | Duxbury . | |
| 5,559,800 | 9/1996 | Mousseau et al. . | |
| 5,566,326 | 10/1996 | Hirsch et al. . | |
| 5,611,048 | 3/1997 | Jacobs et al. . | |
| 5,623,601 | 4/1997 | Vu . | |
| 5,629,981 | 5/1997 | Nerlikar . | |
| 5,657,390 | 8/1997 | Elgamal et al. . | |
| 5,724,355 | * 3/1998 | Bruno et al. | 370/410 |
| 5,774,695 | * 6/1998 | Autrey et al. | 709/227 |
| 5,778,189 | * 7/1998 | Kimura et al. | 709/236 |
| 5,870,544 | 2/1999 | Curtis . | |
| 5,892,900 | 4/1999 | Ginter et al. . | |
| 5,908,469 | 6/1999 | Botz et al. . | |
| 5,910,987 | 6/1999 | Ginter et al. . | |
| 5,915,019 | 6/1999 | Ginter et al. . | |
| 5,917,912 | 6/1999 | Ginter et al. . | |
| 5,933,498 | 8/1999 | Schneck et al. . | |
| 5,941,947 | 8/1999 | Brown et al. . | |
| 5,944,794 | 8/1999 | Okamoto et al. . | |
| 5,949,876 | 9/1999 | Ginter et al. . | |
| 5,982,891 | 11/1999 | Ginter et al. . | |
| 5,983,270 | 11/1999 | Abraham et al. . | |

* cited by examiner

METHOD AND SYSTEM FOR EXTRACTING APPLICATION PROTOCOL CHARACTERISTICS

This application is a continuation-in-part of U.S. application Ser. No. 09/149,911, filed Sep. 9, 1998, now pending.

COPYRIGHT NOICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to pending application Ser. No. 09/149,911 titled METHOD AND SYSTEM FOR PROTECTING OPERATIONS OF TRUSTED INTERNAL NETWORKS, filed Sep. 9, 1998, and application Ser. No. 09/150,112 titled METHOD AND SYSTEM FOR MAINTAINING RESTRICTED OPERATING ENVIRONMENTS FOR APPLICATION PROGRAMS OR OPERATING SYSTEMS, filed Sep. 9, 1998, both of which applications are hereby incorporated by reference into this application.

BACKGROUND OF THE INVENTION

The present invention relates generally to network security and privacy systems, and more particularly to a method and system for continuously and automatically or semi-automatically defining and updating actions which may be taken in an application program operating on a server.

One way in which the security or privacy of data or an application program residing on a server computer may be compromised is through an unauthorized command. That is, a client computer connectable to the server, such as via the Internet, may transmit a request for the retrieval of data or for the execution of an instruction to which the client is not entitled. For example, a web server accessible over the Internet on which goods are available for sale may allow actions such as the selection of an item to purchase, the input of personal and payment data, or even the execution of an application program to retrieve data previously entered. However, the web server should not allow a given client to change price data or retrieve other data intended to be kept private, and these types of requests should be considered unauthorized or disallowable for that client. Currently, many applications do not include safeguards against clients making these kinds of requests.

Presently, service provider networks (e.g., commercial sites, government institutes, e-commerce sites, etc.) are often protected by firewall security devices or routers. These tools provide a good level of security against attacks based on the weaknesses of low level protocols (such as TCP or UDP) and of generic Internet applications like FTP or TELNET. However, these tools cannot guard implementations of specific application protocols, such as a specific banking application, billing application, insurance application, etc., nor can they account for changes or updates to application protocols.

To prevent clients from performing disallowable actions, a gateway or filter mechanism may be interposed between the client and server to identify and eliminate disallowable requests. As shown in FIG. 1, a filter module 14 is positioned between a server 10 and clients, only one of which is shown in FIG. 1 as client 12. The filter module 14 receives requests from the client 12, eliminates any disallowable actions requested by the client 12 to the server 10, and passes the remaining, allowable parts of requests to the server 10. The filter module 14 determines which requests are allowable by querying a protocol database 16. The protocol database 16 stores an application protocol for the application program residing on the server. As used herein, an application protocol represents some or all of the allowable actions for the application program.

An example of a gateway system and related components is described in the aforementioned applications, Ser. Nos. 09/149,911 and 09/150,112, which are incorporated by reference into this application.

In order to create the protocol database 16, a developer must know all the protocols of the application and the authorized or allowable actions. However, for applications which utilize complex protocols, the process of specifying the precise protocol can be long and tedious. In addition, the application developer is often not even aware of the complete protocol specification, as implicit assumptions made by the programmer are usually extremely difficult to identify. Furthermore, the developer must monitor changes in the application protocol and update the protocol database accordingly. Failure to have a complete and accurate protocol database could prevent clients from making fill use of the application program residing on the server. An ineffective database could alternatively allow clients to take actions which are disallowed in the current version of the application program.

There is therefore a need for a method and system for at least semi-automatically defining application protocols for applications residing on servers on an on-line, real-time basis.

BRIEF SUMMARY OF THE INVENTION

It is an object of the present invention to solve the problems described above with security and privacy systems.

It is another object of the present invention to define allowable actions which may be requested by clients of servers.

It is another object of the present invention to provide a mechanism for extracting application protocols on an on-line, real-time basis.

These and other objects are achieved by a method implemented by an extraction computer program for extracting application protocols thereby defining a set of allowable or authorized actions. The method involves receiving a message from a server before it is sent or in parallel with sending to a client. The message may be in response to a specific request for it from the client. In the case of the world wide web, for example, in which clients typically request web documents or pages through browser programs, the requested web page would be intercepted before or in parallel with transmission to the client.

The extraction program then extracts the application protocol data from the server message. The server message typically contains data for one or more communication protocols required for transmission to the client, such as TCP/IP in the case of Internet communications. Working with a copy of the message, the program parses the communications data from the message and saves or discards this information. Then, the program strips off the communications protocol(s) from the message. The program next parses the remaining message to identify commands, fields, or other user-selectable options contained in the message. These items represent the set of allowable or authorized user actions for the application as set forth in the message.

The set of allowable user actions is then stored by the extraction program in a protocol database accessible to a gateway or filter module. The protocol data may be stored on a session by session basis, in which case it is used by the filter module to enforce a protocol policy for each individual client/server session and even for each portion or segment of an application program. When used this way, the protocol data may be continuously updated and changed to represent actions which are allowable at any given point. Alternatively, the protocol data may be collected from many sessions over a period of time and stored to create a larger and more complex protocol database.

In any event, the ability to capture an application protocol from a server message provides for a protocol database which may be continuously updated on an ongoing, real-time basis and which more accurately reflects the set of allowable actions.

DETAILED DESCRIPTION OF THE PREFERRED EMBODIMENTS

Preferred embodiments of the present invention are now described in detail with reference to the drawings in the figures.

Figure 1:
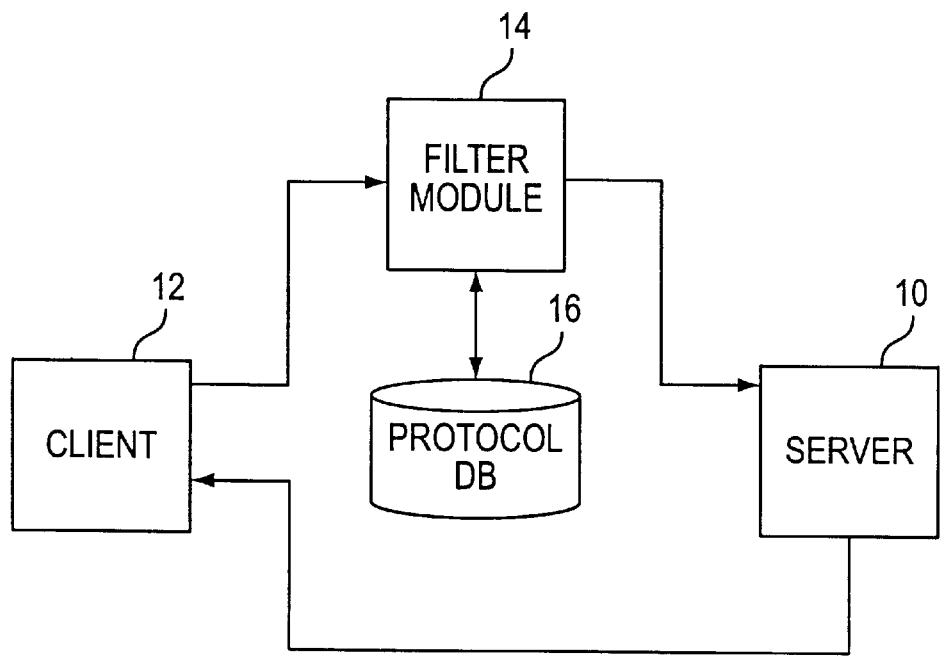
FIG. 1 is a block diagram of a client server system having a gateway for filtering client requests.
Figure 2:
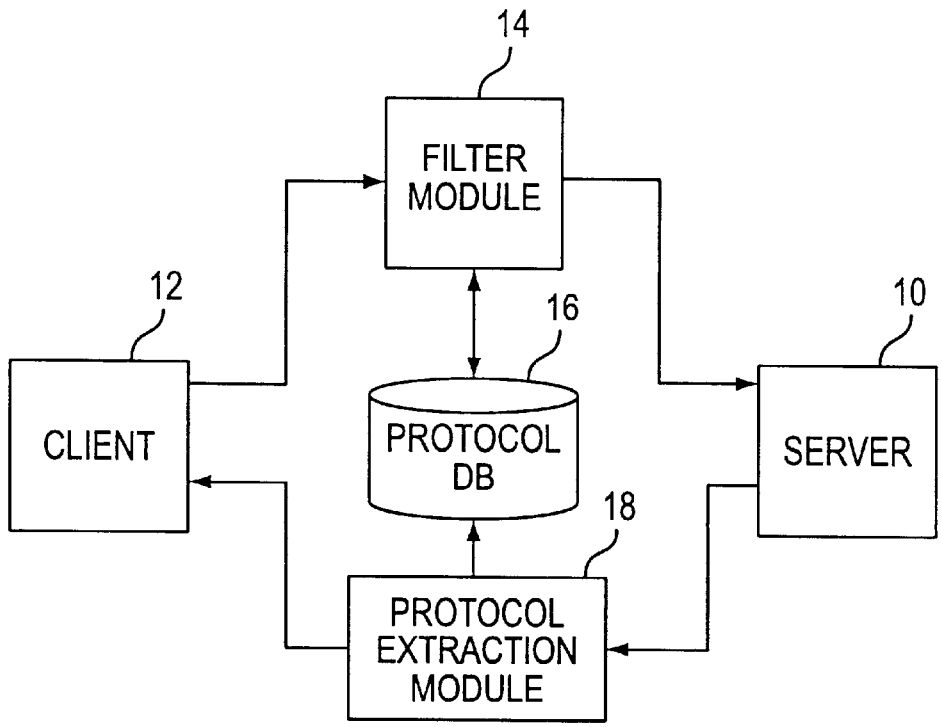
FIG. 2 is a block diagram of the system of FIG. 1 with the addition of a protocol extraction module in accordance with the present invention.

Referring to FIG. 2, a computer network such as the Internet, an intranet or any other private network, connects clients 12 and servers 10, of which only one of each is shown. Associated with the server 10 is a security gateway system consisting of a filter module 14, a protocol database 16, and a protocol extraction module 18. These modules and database may be stored on the server 10, on a computer separate from and connectable to the server 10, or on a number of separate but connectable computers.

The filter module 14 intercepts messages such as requests from the client 12 and queries the protocol database 16 to determine whether the actions or commands in the request are authorized or allowed for the client 12. The protocol database 16 contains a list of the allowable actions, either for a given client/server session, for a "stage" or segment of the application program, or as a static list of actions allowable for a given application program.

Figure 2A:
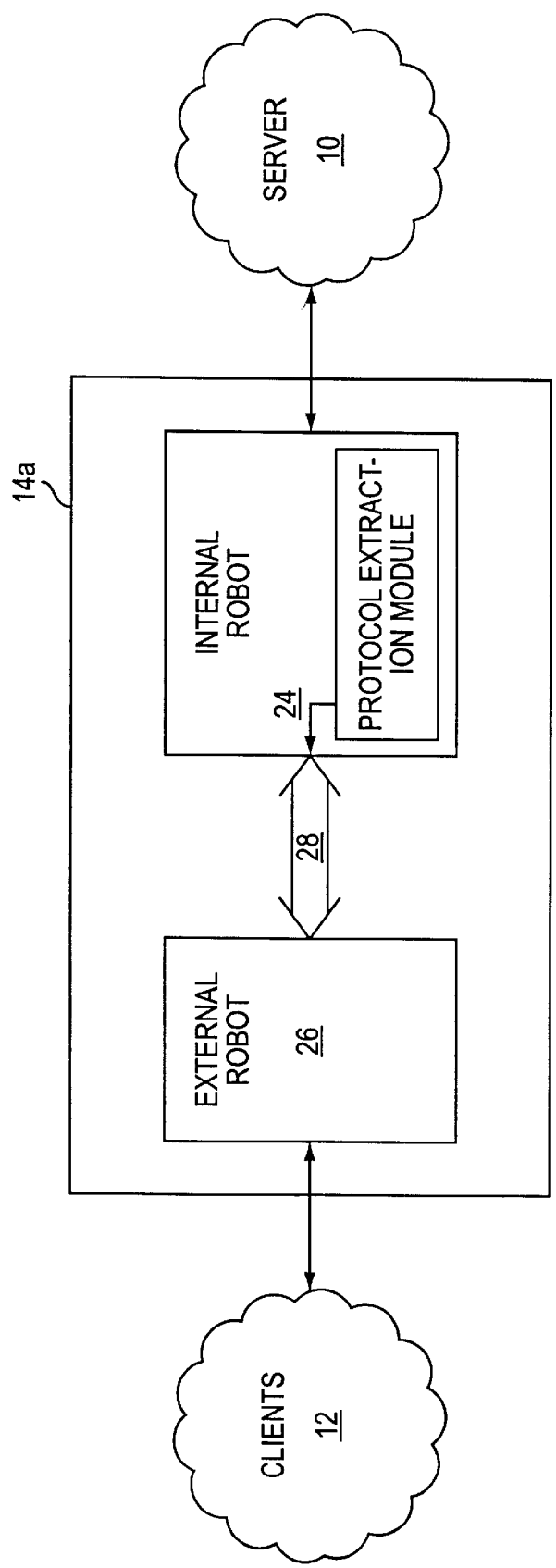
FIG. 2A is a block diagram of one embodiment of the system of FIG. 2 in which the gateway comprises external and internal robots.

In some embodiments, the filter module 14 consists of two or more components as described in application Ser. No. 09/149,911, through which commands and other data in the client communication is converted to a simplified protocol for added security. As shown in FIG. 2A, the gateway 14a contains two separate and distinct processing entities 24, 26, referred to herein as robots, connected via a dedicated, secure communication bus 28. The internal robot 24 is connected to the server 10, and the external robot 26 is connected to clients 12 via the Internet or other external computing environment. Each robot is capable of translating or reducing a communication or message received from the respective environment to a simplified message using a simplified protocol format referred to herein as a clear inter-protocol or CIP, transmitting the CIP message to the other robot using the inter-robot bus 28 using an inter-robot transfer protocol or IRP, and translating such CIP messages received from the other robot into messages formatted for the respective environment. Together, these three elements 24, 26, 28 implement the protection provided by the gateway 14a for the protected internal server 10. The robots 24, 26 are two separate and independent logical processes that execute routines defined by respective security gateway software packages. The robots 24, 26 may be installed on two separate processing devices or one a single processing device operating the one or both of the robots 24, 26 in protected mode.

Each of the robots 24, 26 contains or has access to a protocol manager (not shown) which reduces a message received by the robot for the respective environment to a CIP message for transmission to the other robot, and which also retranslates a message received from the other robot in CIP format into the protocol for the respective native environment. The protocol manager thus uses a database of CIP codes for this reduction and retranslation. As shown in FIG. 2A, the protocol extraction module 18, which resides in the internal robot 24, extracts protocols in messages received by the internal robot 24 from the server 10, extracts the protocols as described herein, and provides the application protocol data to robot 26.

Figure 3:
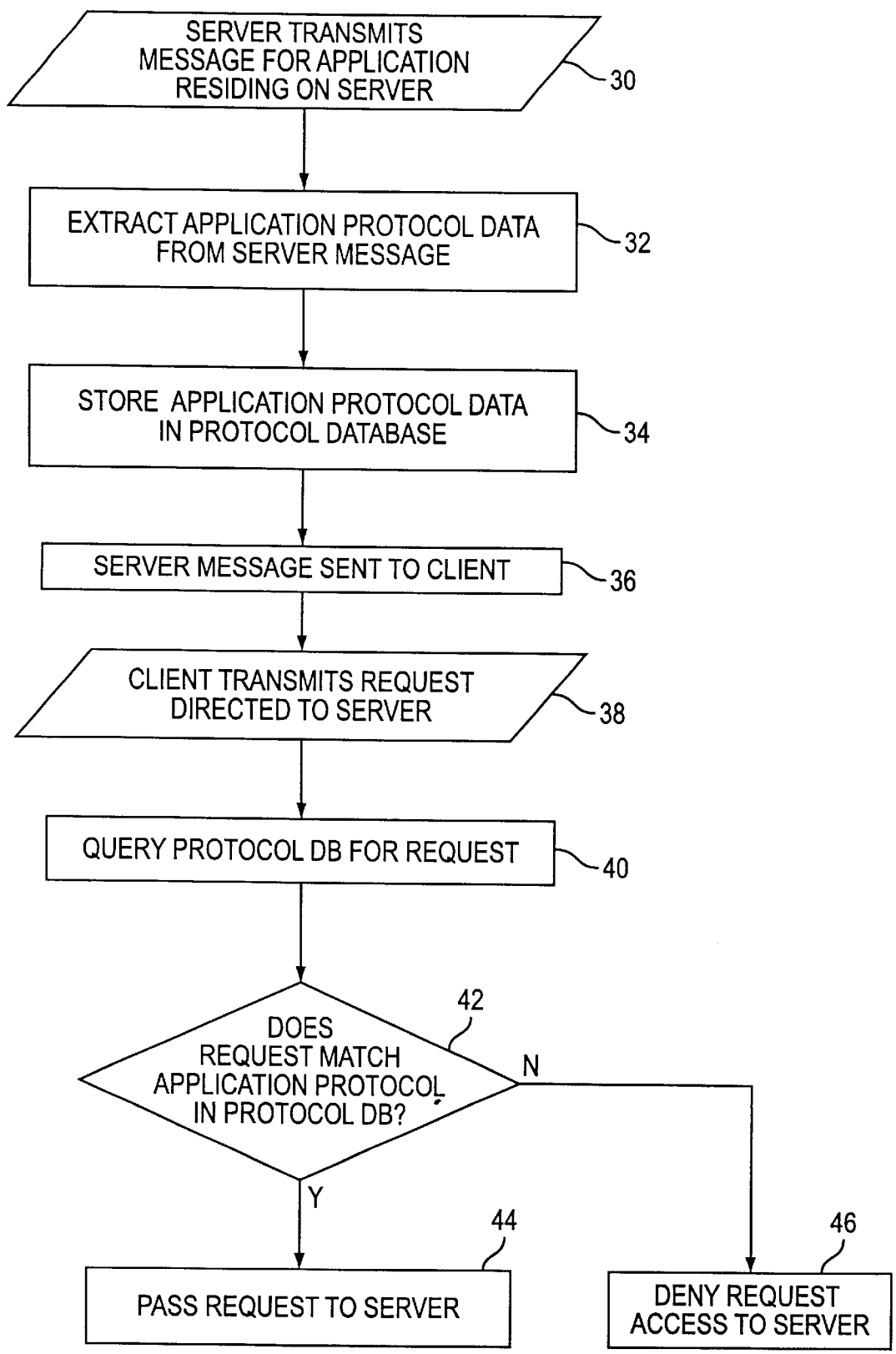
FIG. 3 is a flow chart showing a process of defining allowable actions in an application protocol on an online basis in accordance with the present invention.

In accordance with the invention, the protocol extraction module 18 intercepts server messages and extracts application protocol data for addition to the protocol database 16. The operation of the extraction module 18 in accordance with one embodiment is described with reference to FIG. 3. The server 10 transmits a message directed to the client, step 30, the message containing information relating to the application residing and running on the server 10 or a computer connected thereto. The message may be a response to a request previously received from the client. Using a copy of the server message or the message itself, the application protocol data is extracted from the server message, step 32. As described in more detail below, this extraction process may be performed in a number of ways, including through the use of known techniques to identify a low level or communication protocol, such as TCP/IP, stripping such protocol while retaining required data such as IP source data, and searching the remainder of the message for allowed commands or other authorized user actions.

Once extracted, the application protocol data is stored in the protocol database 16, step 34. The protocol data may be added to a permanent file relating to the current version of the application, to a temporary, session-based file used for a particular client/server session only, or to a temporary file used only for a particular server message and then overwritten. All of these options allow for the automatic adaptation to changes in an application and for the continuous modification of the protocol database to account for allowable actions in different segments or stages of an application. These options differ to the extent that protocols from prior messages remain relevant for future messages.

The server message is transmitted to the client, step 36. The client then transmits a request directed to the server, step 38. The client's request may be a proper response to the server message or may be an attempt to cause the application to execute an unauthorized command. The filter module 14 intercepts the client request, reads it, and queries the protocol database, step 40. Depending upon the security and privacy desired, the query may need to identify the client, the server, the particular application and/or the particular session.

The request is compared to the application protocol database to determine whether the request is allowable, step 42. If the request is allowable, the filter module 14 passes the request along to the server, step 44. If the request does not match any of the actions in the application protocol in the protocol database 16 and is thus considered disallowable, the request is denied access to the server, step 46, and the client 12 and/or server 10 may be notified of the attempted unauthorized request.

Figure 4:
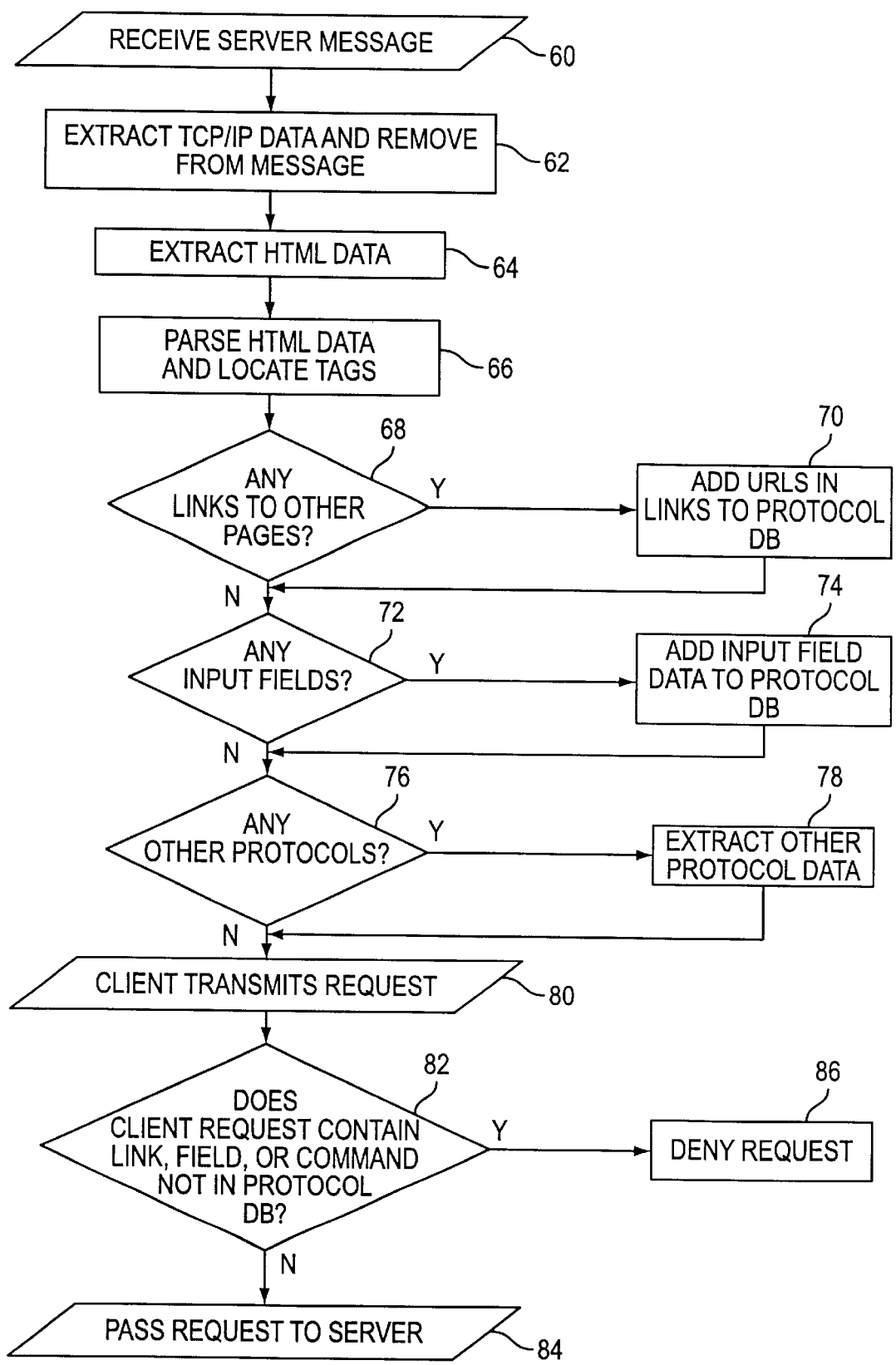
FIG. 4 is a flow chart showing part of a process of defining allowable actions in an HTML file transmitted from a web server over the Internet in accordance with embodiments of the present invention.

An embodiment of the protocol extraction method used for web-based communications is shown in FIG. 4. The extraction module receives the server message, which is a web document or HTML page, step 60. The TCP/IP protocol data is extracted from the document, step 62, and saved to help identify the source IP address to, for example, maintain a session with the client to whom the message was addressed. Other communication data such as HTTP is further stripped from the document until the module reads the HTML data, step 64.

From this data, the module collects information about the design of the particular application. This is accomplished by parsing the HTML document data and locating all the tags, step 66. For tags such as anchors which define links to other web documents, step 68, the link with URL is added to the protocol database, step 70. This applies, for example, with home pages of a web server containing links to many other pages on the server, or with links embedded within certain types of multimedia files such as those contained in Shockwave, RealAudio or RealVideo files. The extraction module also locates any input fields in the web document, step 72, which may be positioned, for example, within an HTML form. The identity and nature of the field data for such fields, including the type and length of the field, is then added to the protocol database, step 74. If no field length is specified, a default field length is used. For example, a "name" field is listed in the protocol database as requiring alphanumeric data of a given length in the client request, a date field is listed as requiring date formatted alphanumeric data, and an "email address" field requires email formatted data, e.g., a@b.c.

Using similar steps, the protocol extraction module will also check for forms, fields, fixed fields, hidden fields, menu options, DOM components, etc. For each of these elements, the protocol database will be updated as to their nature and any limitations thereon. For example, for all hidden fields identified, the database will be updated as to their nature and that the client may not change their content.

The extraction module flither identifies any other actions available in the web document, step 76. These include, for example, a "submit" command on an HTML form, a "search" command, or other application-level protocols. These additional actions within the web document are also extracted and stored in the protocol database, step 78.

Once the gateway or filter receives a client request, step 80, it compares each link, data, command, or other action in the request with the corresponding entities now stored in the protocol database, step 82. If no such disallowed actions are in the request, the request is transmitted to the server, step 84. Otherwise, any link, data, or command not contained in the protocol database is deleted from the request or, alternatively, the entire request is denied, step 86.

Figure 5:
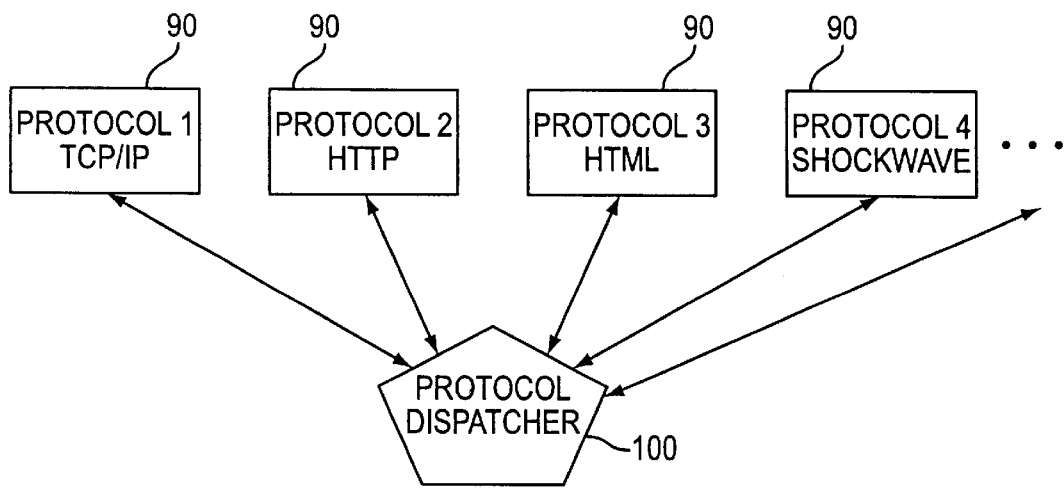
FIG. 5 is a block diagram showing a protocol dispatcher component of the protocol extraction module of FIG. 2 acting on an HTML file in accordance with embodiments of the present invention.
Figure 6:
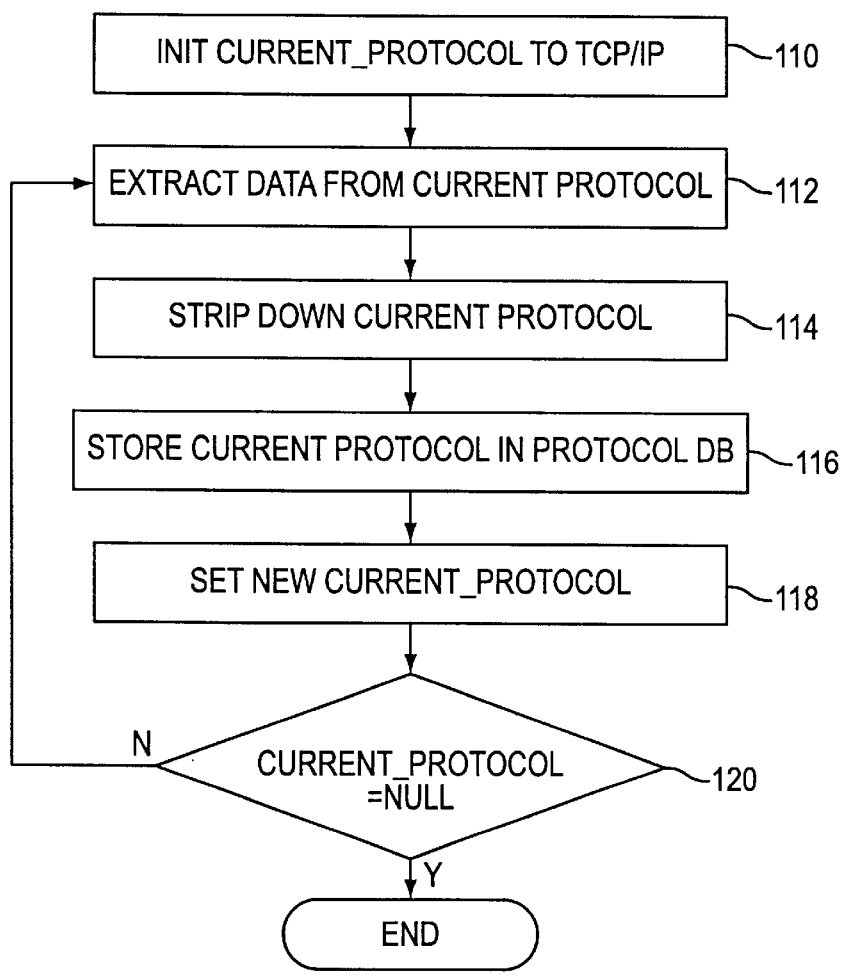
FIG. 6 is a flow chart showing a protocol extraction process performed by the protocol dispatcher component of FIG. 5.

Referring now to FIGS. 5 and 6, in some embodiments the protocol extraction module contains a protocol dispatcher 100 which coordinates and manages the extraction process. As shown in FIG. 5, the dispatcher 100 extracts one protocol 90 at a time, starting for example, with TCP/IP, HTTP, HTML, and any other protocols. In the web environment, upon receiving a message the dispatcher 100 initializes a variable current_protocol to TCP/IP, step 110 in FIG. 6. Data is then extracted from the current protocol, step 112, and the current protocol is then stripped out of the message, step 114. The current protocol is then stored in the protocol database, step 116, or alternatively, the dispatcher 100 may proceed through all the protocols before updating the protocol database.

The variable current_protocol is then incremented or otherwise set to a new protocol, step 118. If the current_protocol is now NULL, step 120, meaning that no additional protocols remain to be extracted, the process is complete. Otherwise, the data if any in the message relating to the new current protocol is extracted, step 112, and the process repeated until complete.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for defining a set of allowable actions for an application program residing on a server, the method comprising:

receiving a message transmitted by the server addressed to one or more clients;

extracting application protocol data from the server message to thereby retrieve the set of allowable actions which may be taken in response to the server message;

storing the extracted application protocol data in a protocol database.

2. The method of claim 1, wherein the step of extracting the application protocol data comprises stripping communications protocol data from the message.

3. The method of claim 2, wherein the step of extracting the application protocol data comprises parsing the message after stripping off the communications protocol data to identify protocols contained in the message.

4. The method of claim 3, wherein parsing the message comprises parsing the message to identify one or more commands allowed in the server message.

5. The method of claim 3, wherein parsing the message comprises parsing the message to identify one or more input fields in the server message.

6. The method of claim 5, wherein storing the extracted application protocol data comprises storing the identified input field or fields in association with a data type and length for each input field.

7. The method of claim 3, wherein parsing the message comprises parsing the message to identify one or more hyperlinks within the server message.

8. The method of claim 2 wherein the server message is sent in response to a request from a client to whom the message is addressed, comprising storing the stripped communication protocol data or portion thereof which represents the address of the client.

9. The method of claim 4, wherein the step of storing the extracted application protocol data in the protocol database comprises storing the extracted application protocol data in association with the communication protocol data representing the client address to thereby enable a session with the client.

10. The method of claim 1, comprising:
receiving a request from a client addressed to the server;
comparing one or more actions in the client request with the stored application protocol data in the protocol database; and
disallowing any action contained in the client request which is not contained in the protocol database.

11. The method of claim 1, comprising:
receiving a second server message addressed to one or more clients; and
extracting second application protocol data from the second server message to thereby retrieve a second set of allowable actions which may be taken in response to the second server message.

12. The method of claim 11, comprising storing the extracted second application protocol data in the protocol database by adding it to extracted protocol data previously stored in the protocol database.

13. The method of claim 12, comprising storing the extracted second application protocol data in the protocol database in association with the data identifying second server message.

14. The method of claim 11, comprising storing the extracted second application protocol data in the protocol database by overwriting extracted protocol data previously stored in the protocol database.

15. A security gateway system interposed between an external computing environment and an internal computing environment, the system comprising:
a protocol database storing a set of allowable actions which may be taken in an application program residing on the internal computing environment;
a filter module for receiving an external message from the external computing environment, querying the protocol database, and refusing to pass to the internal environment any portion of the external message not contained in the protocol database; and
a protocol extraction module for receiving an internal message from the internal computing environment, extracting application protocol data from the internal message, and storing the extracted application protocol data in the protocol database.

16. The security gateway system of claim 15 wherein the filter module comprises a first processing entity for receiving the external message from the external environment, the external message containing content represented in one or more external environment protocols, for converting the external message to a simplified message by mapping all or part of the external message content into a simplified representation of the content in accordance with a simplified protocol, the simplified protocol defining a simplified representation for only some content which may be contained in a message represented in the one or more external environment protocols, and for transmitting the simplified message.

17. The system of claim 16, comprising:
a second processing entity for receiving the simplified message transmitted by the first processing entity, for converting the simplified message to an internal message by mapping the simplified representation of the content into an internal representation of the content in accordance with one or more internal environment protocols, and for transmitting the internal message to an application operating on the internal computing environment; and
a communication channel between the first and second processing entities for transferring the simplified message.

18. The system of claim 17, wherein the protocol extraction module is contained within the second processing entity.

19. In a communication system in which a server is connectable to clients, a method for limiting clients to allowable actions for one or more application programs residing on the server, the method comprising:
receiving messages transmitted by the server addressed to one or more clients;
deriving from the server messages sets of allowable actions which may be taken in response to each of the server messages;
receiving requests from a client addressed to the server, each request containing one or more actions requested by the client;
comparing the one or more actions in each of the requests with at least one of the sets of allowable actions; and
disallowing any action contained in a request which is not in the at least one set of allowable actions.

20. The method of claim 19, wherein deriving sets of allowable actions from the server messages comprises parsing the messages to identify commands allowed in the server messages, and wherein disallowing any action in a client request comprises disallowing any action in the request which attempts to execute a command other than the identified commands.

21. The method of claim 19, wherein deriving sets of allowable actions from the server messages comprises parsing the messages to identify input fields in the server messages.

22. The method of claim 21, comprising associating each identified input field with a data type and length, and wherein disallowing any action in a request comprises disallowing any action in the request which attempts to input data in a given input field which is contrary to the data type or longer than the length associated with the given input field.

23. The method of claim 19, wherein deriving sets of allowable actions from the server messages comprises parsing the messages to identify hidden fields in the server messages, and wherein disallowing any action in a request comprises disallowing any action in the request which attempts to change data in a given hidden field.

24. The method of claim 19, wherein deriving sets of allowable actions from the server messages comprises parsing the messages to identify hyperlinks including addresses within the server message, and wherein disallowing any action in a request comprises disallowing any action in the request which attempts to link to an address other than the address in the identified hyperlinks.

25. A computerized application protocol extraction module comprising an extraction program which, when executed, causes the protocol extraction module to perform a method for defining a set of allowable actions for an application program residing on a server, the method comprising:

receiving a message transmitted by the server addressed to one or more clients;

extracting application protocol data from the server message to thereby retrieve the set of allowable actions which may be taken in response to the server message; and storing the extracted application protocol data in a protocol database.

26. A computerized security module comprising an extraction program which, when executed, causes the security module to perform a method for limiting clients to allowable actions for one or more application programs residing on the server, the method comprising:

receiving messages transmitted by the server addressed to one or more clients;

deriving from the server messages sets of allowable actions which may be taken for the application program in response to the server messages;

receiving requests from a client addressed to the server, each request containing one or more actions requested by the client;

comparing the one or more actions in each of the requests with at least one of the sets of allowable actions; and disallowing any action contained in a request which is not in the at least one set of allowable actions.

* * * * *

UNITED STATES PATENT AND TRADEMARK OFFICE
CERTIFICATE OF CORRECTION

PATENT NO. : 6,311,278 B1
DATED : October 30, 2001
INVENTOR(S) : Raanan et al.

It is certified that error appears in the above-identified patent and that said Letters Patent is hereby corrected as shown below:

Title page,
Item [75] Inventors, replace "Yoron" with -- Yaron --;

Column 2,
Line 28, replace "fill" with -- full --;

Column 6,
Line 1, replace "flither" with -- further --.

Signed and Sealed this

Fourth Day of June, 2002

*Attest:*

*Attesting Officer*

JAMES E. ROGAN
*Director of the United States Patent and Trademark Office*